(12) United States Patent
Whitman, Jr.

(10) Patent No.: US 7,499,844 B2
(45) Date of Patent: Mar. 3, 2009

(54) METHOD AND SYSTEM FOR PREDICTING NETWORK USAGE IN A NETWORK HAVING RE-OCCURRING USAGE VARIATIONS

(75) Inventor: Raymond Whitman, Jr., Grayson, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 406 days.

(21) Appl. No.: 10/741,738

(22) Filed: Dec. 19, 2003

(65) Prior Publication Data

US 2005/0138153 A1 Jun. 23, 2005

(51) Int. Cl.
G06F 9/455 (2006.01)

(52) U.S. Cl. .............................. 703/6; 709/224; 705/10

(58) Field of Classification Search ..................... 703/6; 709/224, 205, 225; 705/1, 10, 32; 370/352, 370/238, 229, 237, 236, 230, 265.02, 266.08, 370/256.02; 714/4; 379/266.08, 265.02; 434/219; 706/50

See application file for complete search history.

(56) References Cited

U.S. PATENT DOCUMENTS

| | | | |
|---|---|---|---|
| 5,185,780 A | 2/1993 | Leggett | |
| 5,872,938 A | 2/1999 | Williams | |
| 5,903,641 A | 5/1999 | Tonisson | |
| 5,963,635 A | 10/1999 | Szlam et al. | |
| 5,974,414 A | 10/1999 | Stanczak et al. | |
| 5,991,390 A | 11/1999 | Booton | |
| 6,044,355 A | 3/2000 | Crockett et al. | |
| 6,490,252 B1 * | 12/2002 | Riggan et al. | ............... 370/237 |
| 6,493,446 B1 | 12/2002 | Cherry | |
| 6,584,191 B1 | 6/2003 | McPartlan et al. | |
| 6,639,982 B1 | 10/2003 | Stuart et al. | |
| 6,775,378 B1 | 8/2004 | Villena et al. | |
| 6,842,515 B2 | 1/2005 | Mengshoel et al. | |
| 6,865,266 B1 | 3/2005 | Pershan | |
| 6,996,076 B1 | 2/2006 | Forbes et al. | |
| 7,023,979 B1 | 4/2006 | Wu et al. | |
| 7,103,562 B2 | 9/2006 | Kosiba et al. | |
| 7,203,655 B2 | 4/2007 | Herbert et al. | |
| 7,321,657 B2 | 1/2008 | Whitman | |

(Continued)

OTHER PUBLICATIONS

Mehrotra et al., "Call center simulation modeling: methods, challenges and opportunities", 2003 Winter simulation conference.*

(Continued)

Primary Examiner—Paul L Rodriguez
Assistant Examiner—Kandasamy Thangavelu
(74) Attorney, Agent, or Firm—Thomas, Kayden, Horstemeyer & Risley LLP

(57) ABSTRACT

Systems and methods for scheduling of operators for a network, which in one embodiment among many, can be broadly summarized by a representative method of establishing a database of past network statistics and a database of predictably re-occurring variations, and forecasting network usage for a given future date using the past network statistics and the predictably re-occurring variations. Another embodiment can be described as a network usage predictor that has logic configured to establish a database of past network statistics, logic configured to establish a database of predictably re-occurring variations, and logic configured to forecast network usage for a given future date using the past network statistics and the predictably re-occurring variations.

22 Claims, 6 Drawing Sheets

U.S. PATENT DOCUMENTS

| | | | |
|---|---|---|---|
| 2001/0034637 A1* | 10/2001 | Lin et al. | 705/10 |
| 2001/0038689 A1 | 11/2001 | Liljestrand et al. | |
| 2001/0043586 A1* | 11/2001 | Miloslavsky | 370/352 |
| 2002/0041673 A1* | 4/2002 | Berrondo et al. | 379/266.06 |
| 2002/0143599 A1* | 10/2002 | Nourbakhsh et al. | 705/9 |
| 2002/0157043 A1* | 10/2002 | Hite et al. | 714/51 |
| 2002/0159439 A1 | 10/2002 | Marsh et al. | |
| 2003/0007622 A1* | 1/2003 | Kalmanek et al. | 379/219 |
| 2003/0088534 A1* | 5/2003 | Kalantar et al. | 706/50 |
| 2003/0095652 A1* | 5/2003 | Mengshoel et al. | 379/265.06 |
| 2003/0231595 A1* | 12/2003 | Zino et al. | 370/238 |
| 2004/0019542 A1* | 1/2004 | Fuchs et al. | 705/32 |
| 2004/0062231 A1* | 4/2004 | Wyatt | 370/352 |
| 2004/0128379 A1* | 7/2004 | Mizell et al. | 709/224 |
| 2004/0138944 A1 | 7/2004 | Whitacre et al. | |
| 2004/0165531 A1* | 8/2004 | Brady | 370/236 |
| 2004/0165716 A1* | 8/2004 | Galvin | 379/265.02 |
| 2004/0168100 A1* | 8/2004 | Thottan et al. | 714/4 |
| 2005/0007955 A1* | 1/2005 | Schrodi | 370/230 |
| 2005/0013287 A1* | 1/2005 | Wallentin et al. | 370/352 |
| 2005/0043986 A1* | 2/2005 | McConnell et al. | 705/11 |
| 2005/0071211 A1* | 3/2005 | Flockhart et al. | 705/8 |
| 2005/0131748 A1* | 6/2005 | Parker | 705/8 |
| 2005/0135600 A1* | 6/2005 | Whitman, Jr. | 379/266.08 |
| 2005/0135601 A1* | 6/2005 | Whitman, Jr. | 379/266.08 |
| 2005/0137893 A1* | 6/2005 | Whitman, Jr. | 705/1 |
| 2005/0138167 A1* | 6/2005 | Whitman, Jr. | 709/224 |
| 2005/0160142 A1* | 7/2005 | Whitman, Jr. | 709/205 |
| 2005/0175971 A1* | 8/2005 | Mcilwaine et al. | 434/219 |
| 2006/0120282 A1* | 6/2006 | Carlson et al. | 370/229 |

OTHER PUBLICATIONS

Bapat et al., "Using simulation in call centers", 1998 Winter simulation conference.*

Klunge., "Simulation of a claims call center: A success and a failure", 1999 Winter simulation conference.*

Mehrotra et al., "Call center simulation modeling: Methods, challenges and opportunities", 2003 Winter simulation Conference.*

Klunge, "Simulation of claim call center: A success and a failure", 1999 Winter simulation conference.*

Whitman; Non-Final Rejection mailed Sep. 26, 2008 for U.S. Appl. No. 10/741,650 filed Dec. 19, 2003.

Whitman; Final Rejection mailed Oct. 21, 2008 for U.S. Appl. No. 10/741,394 filed Dec. 19, 2003.

* cited by examiner

46 ⟶

| STATISTICAL ANALYSIS/ FORECAST MODULE | 48 |
|---|---|
| STATISTICAL DATABASE | 50 |
| ACCUMULATED STATISTICS | 54 |
| DAILY LOG | 56 |
| AGENT PROFILE DATABASE | 52 |

FIG. 3

| DAILY LOG | 56 |
|---|---|
| WORK FORCE | 5 |
| DATE | 08/21/2003 |
| DAILY CALL VOLUME | 35,294 |
| DAILY WORK VOLUME | 47,503 |
| DAILY AWT | 27.9 |
| DAILY ANS | 2.4 |
| DAILY OCC | 85 |

FIG. 4

| ACCUMULATED STATISTICS | 54 |
|---|---|
| WORK FORCE | 5 |
| CALL VOLUME | 35,214 |
| WORK VOLUME | 9,684 |
| AWT | 27.5 |
| ANS | 2.7 |
| OCC | 91 |

FIG. 5

| AGENT PROFILE | 52(A) |
|---|---|
| AGENT | 123456789 |
| WORK FORCE | 16 |
| OFFICE | 5 |
| LANGUAGE SKILLS | |
| ENGLISH | 1 |
| SPANISH | 1 |
| GERMAN | 0 |
| FRENCH | 0 |
| JAPANESE | 0 |
| CHINESE | 0 |
| WORK SKILLS | |
| DIRECTORY ASSISTANCE | 1 |
| BILLING | 1 |
| CUSTOMER SERVICE | 0 |
| TECHNICAL SERVICE | 0 |
| DA RATING | |
| AWT | 2.5 |
| ERROR RATE | 0.3 |
| TOUR COMPLIANCE | 90 |
| SWITCH TOUR COMPLIANCE | 94 |
| EXPERIENCE | 2.1 |
| BILLING RATING | |
| AWT | 5.5 |
| ERROR RATE | 1.5 |
| TOUR COMPLIANCE | 90 |
| SWITCH TOUR COMPLIANCE | 93 |
| EXPERIENCE | 5.1 |

FIG. 6

| ABNORMAL DAY | GROUP | SCALE | FREQUENCY | DATE |
|---|---|---|---|---|
| PRESIDENTIAL INAUGURATION | 0 | 99% | 4 | 01/20/2004 |
| SUPER BOWL | 1 | 105% | 1 | 02/01/2004 |
| 3 WEEK THANKS-GIVING/CHRISTMAS | 2 | 118% | | |
| PRESIDENTIAL ELECTION | 2 | 95% | 4 | 11/04/2003 |

FIG. 7

| TIME | 00:15 | 00:30 | 11:45 | 12:00 | 12:15 | 23:45 | 24:00 |
|---|---|---|---|---|---|---|---|
| PROJECTED # | 6 | 6 | 18 | 22 | 30 | 6 | 4 |

FIG. 8

METHOD AND SYSTEM FOR PREDICTING NETWORK USAGE IN A NETWORK HAVING RE-OCCURRING USAGE VARIATIONS

CROSS-REFERENCE TO RELATED APPLICATIONS

This application is one of seven related co-pending U.S. utility patent applications, which are all filed on the same day as the present application. The other six patent applications, which are each incorporated in their entireties by reference herein, are listed by application number and title as the following:

Ser. No. 10/740,873—"Generation of Automated Recommended Parameter Changes Based on Force Management System (FMS) Data Analysis";

Ser. No. 10/740,873, currently issued as U.S. Pat. No. 7,321,657 on Jan. 21, 2008—"Dynamic Force Management System";

Ser. No. 10/741,612, currently issued as U.S. Pat. No. 7,406,171 on Jul. 9, 2008—"Agent Scheduler Incorporating Agent Profiles";

Ser. No. 10/741,650—"Resource Assignment in a Distributed Environment";

Ser. No. 10/741,394—"Efficiency Report Generator"; and

Ser. No. 10/741,643—"Force Management Automatic Call Distribution and Resource Allocation Control System".

TECHNICAL FIELD

The present disclosure is generally related to network usage and, more particularly, is related to a system and method for predicting network usage.

BACKGROUND OF THE DISCLOSURE

A modern telephony system includes a switch that routes incoming calls to individuals, agents, usually located in a call center, or a remote office, and a control center that receives information from the switch. The control center includes a call-supervisor that is trained to review the information from the switch and trained to monitor the call traffic to maintain a balance between call demand and the workforce. The call-supervisor is responsible for making certain that the workforce has a sufficient number of agents working at any given time to serve customer demand.

In a modern telephony system, the agents are frequently distributed in remote locations to handle subscriber services. Typically, the agents are assigned to specific workforces, where a given workforce handles specific types of calls such as directory assistance, or billing assistance, etc. Normally, the work schedules for the agents in a workforce are planned approximately one or two weeks in advance. During the course of a year, there are days that have abnormal call volume, i.e., call volume that is either greater than (or less than) a statistically "average day". Consequently, on an abnormal day, more or fewer agents are needed to handle calls than on an average day. Unfortunately, schedulers are often ill-equipped to plan for such abnormal days. Consequently, a solution to this and other problems is needed.

SUMMARY OF THE DISCLOSURE

Embodiments, among others, of the present disclosure provide a system and method for scheduling agents of a network.

Briefly described, in architecture, one embodiment of the system, among others, is implemented as follows. A network usage predictor includes logic configured to establish a database of past network statistics, logic configured to establish a database of predictably re-occurring variations, and logic configured to forecast network usage for a given future date using the past network statistics and the predictably re-occurring variations.

One embodiment of the present disclosure can also be viewed as providing methods for predicting network usage. In this regard, one embodiment of such a method, among others, can be broadly summarized by the following steps: establishing a database of past network statistics and a database of predictably re-occurring variations, and forecasting network usage for a given future date using the past network statistics and the predictably re-occurring variations.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a block diagram of a database.

FIG. 4 is a block diagram of a daily log of the telephony system.

FIG. 5 is a block diagram of accumulated statistics of the telephony system.

FIG. 6 is a block diagram of an agent profile.

FIG. 7 is a block diagram of a predictable variable table.

FIG. 8 is a block diagram of the projected agent line.

DETAILED DESCRIPTION OF THE PREFERRED EMBODIMENT

The present disclosure is described in terms of managing resources in call centers for a telephone system. However, this description is for illustrative purposes only and is a non-limiting example of the present disclosure. The present disclosure can also be implemented in any organization, among others, having workforces that respond to variable workloads such as, but not limited to, a group of agents receiving calls through an automated call distribution process including private branch exchange (PBX) and switching configuration. Thus, the present disclosure is intended to cover any network.

Any process descriptions or blocks in flow charts should be understood as representing modules, segments, or portions of code which include one or more executable instructions for implementing specific logical functions or steps in the process, and alternate implementations are included within the scope of preferred embodiments in which functions may be executed out of order from that shown or discussed, including substantially concurrently or in reverse order, depending on the functionality involved, as would be understood by those reasonably skilled in the art of the present disclosure.

Figure 1:
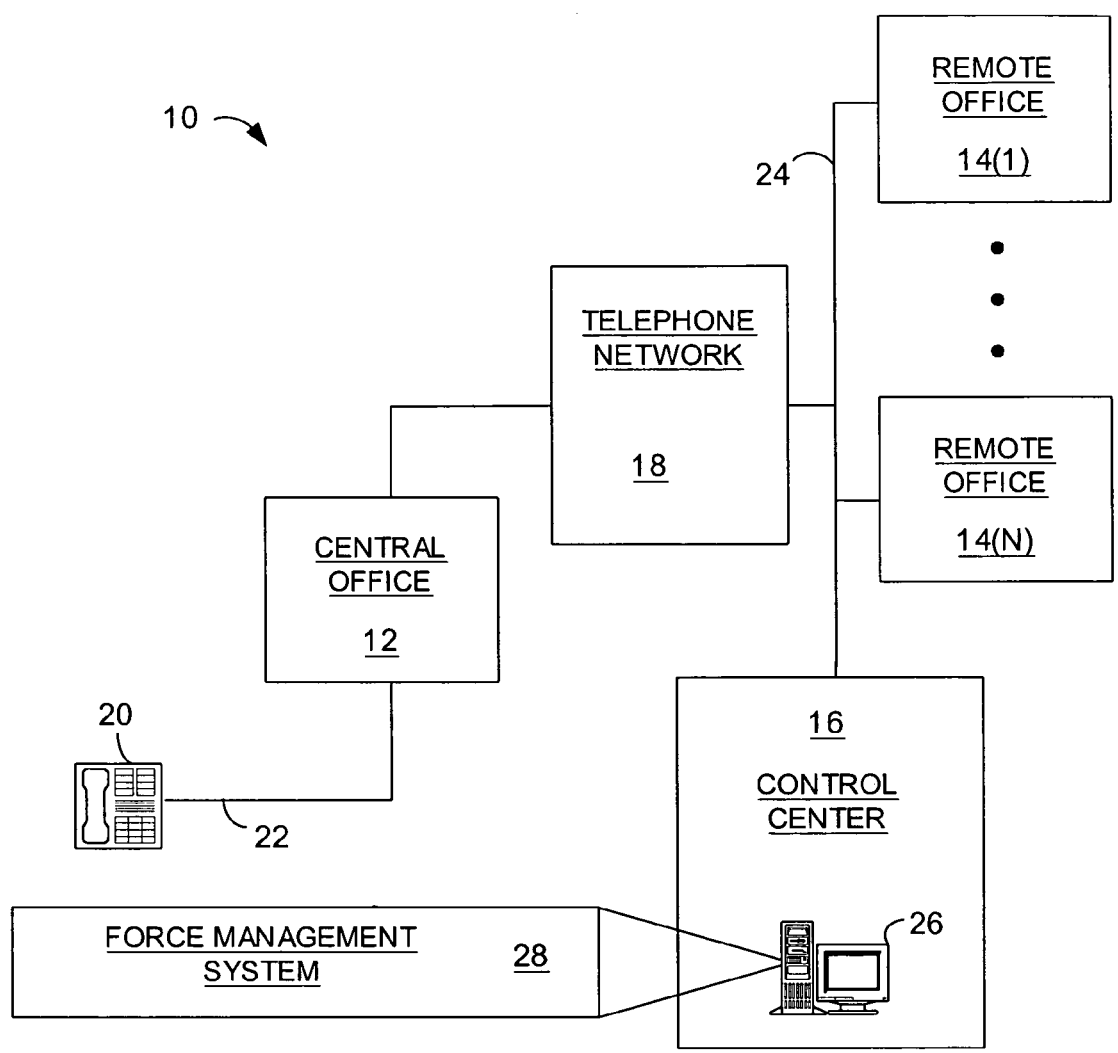
FIG. 1 is a block diagram of a telephony system.

Referring to FIG. 1, a telephone system 10 having a central office 12, a plurality of remote offices 14, and a control center 16, are all connected to a telephone network 18. A subscriber uses a telephone 20, which is connected to the central office 12 via a communication link 22, to access services of the telephone system.

The central office 12 includes a switch (not shown) that routes the subscriber's call to the telephone network 18, which includes general telephony circuitry such as central offices, trunks, end-offices, etc., known to those skilled in the art.

Typically, the remote offices are call centers from which agents make or receive calls, which handle, among other things, incoming subscriber service calls such as, but not limited to, "Directory Assistance Type" calls and "Billing Type Calls". Responsive to the subscriber's call being a service call, the central office 12 routes the call through the network to one of the remote offices 24, via a communication link 24, where an agent handles the call. The communication links 22 and 24 can be any communication link: wired, wireless, optical fibers, etc., known to those skilled in the art.

Typically, the telephone system 10 must meet performance requirements established by a regulatory body, and the control center 16 is responsible for, among other things, providing the necessary human resource, e.g., agents, to the remote offices 14 to meet the performance requirements. The control center 16 includes supervisory personnel, call-supervisors, (not shown) and a computer system 26 having a force management system (FMS) 28 included therein. Generally, a computer network 44 (see FIG. 2) connects the central office 12, remote centers 14, and the control center 16 such that the FMS 28 and other computer services are available to authorized personnel at any of the locations.

In one embodiment, among others, schedulers employ the FMS 28 to generate, among other things, agent lines, which are explained in detail hereinbelow, and tours (work shifts) for agents. The schedulers may be remotely located but are usually located in the control center 16.

Figure 2:
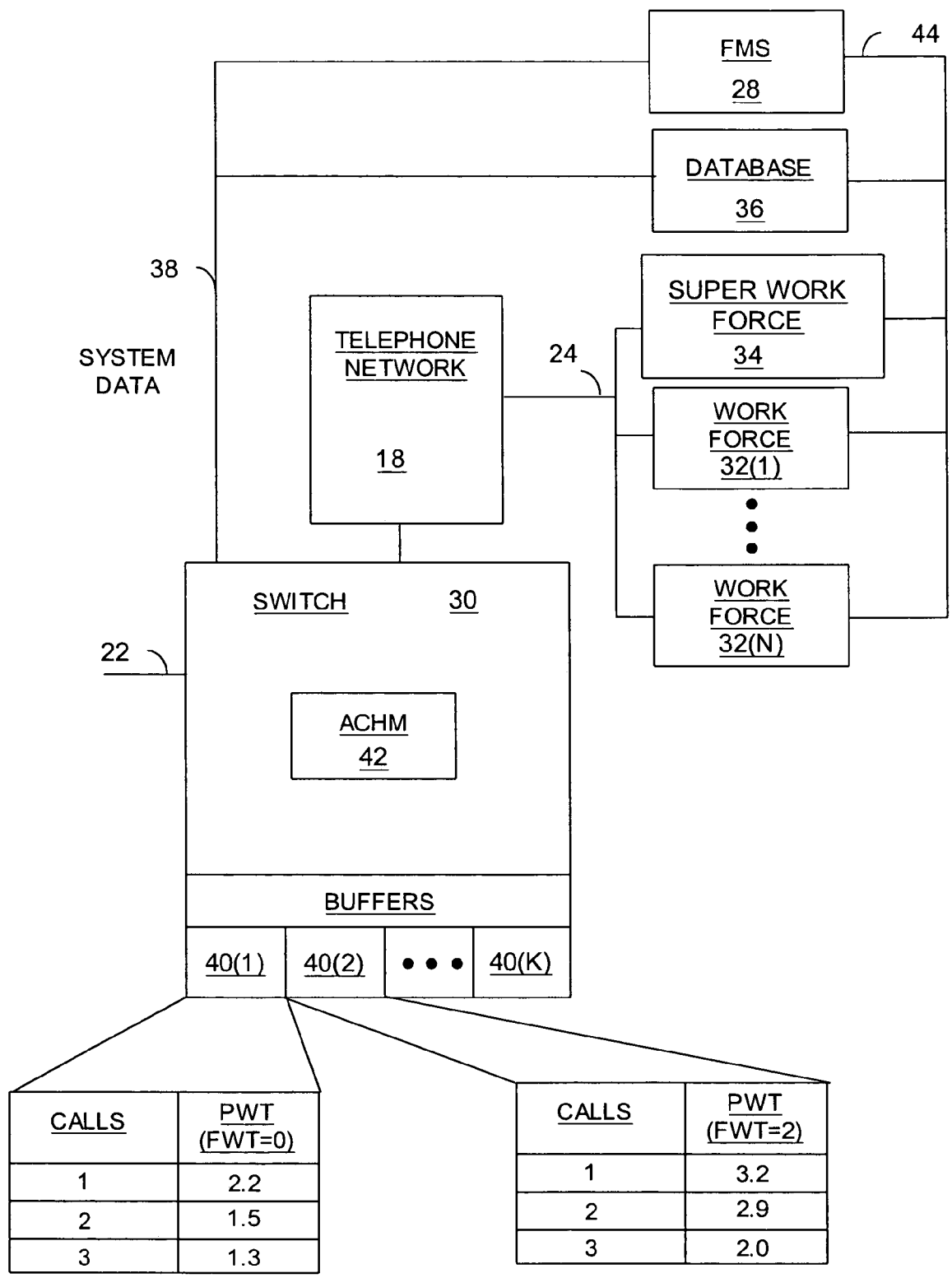
FIG. 2 is a block diagram of a portion of a telephony system.

Referring to FIG. 2, the central office 12 includes a switch 30, which receives telephone calls from subscribers via communication link 22 and, among other things, routes the calls to workforces 32 and super workforce 34. For the purposes of this disclosure, a workforce is comprised of a set of agents assigned to handle a specific type of call. For example, workforce 32(1) is a directory assistance (DA) workforce; and workforce 32(2) (not shown) is a billing workforce of the telephone system 10. Other workforces include workforces that call out instead of receiving incoming calls, an example of which is a telemarketing workforce. Each workforce 32 maybe distributed throughout multiple remote offices 14.

A super workforce 34 is comprised of agents assigned to handle multiple types of calls. For example, agents of the super workforce 34 might be assigned to handle both directory assistance calls and other types of incoming calls for subscribers speaking a language other than English. The super workforce 34 may also be distributed through multiple remote offices 14. For the purposes of this disclosure, a super-workforce shall be treated as if it were a "workforce."

In one preferred embodiment, the switch 30 is an automated computerized system such as, but not limited to, Northern Telecom DMS 200, Northern Telecom Meridian, Rockwell ISS-3000, and Lucent 5E into which agents log in. To log-in, each agent provides a user-name and a password, which in some embodiments may be optional. The switch 30 is in communication with a database 36 via a communication link 38. The database 36 includes agent profiles 52 (see FIG. 6), and each agent profile 52 provides, among other things, information regarding the training and efficiency of the agent. When an agent logs onto the switch 30, the switch 30 uses the agent profile 52 for that agent to determine, among other things, the agent's workforce. The switch 30 also determines, during the log-in procedure, from which console/terminal (not shown) the agent is working. When an agent is logged into the switch 30, the switch 30 monitors call traffic to the agent and whether the agent is logged into the switch 30 and provides this system information, among other information to the database 36. Generally, the agent logs out of the switch 30 for breaks and training so that the switch 30 knows that the agent is not available to handle calls. The log-out times are also included in the system data.

Among other things, for certain types of calls the switch 30 attempts to handle incoming calls automatically. If the switch 30 cannot handle the incoming calls automatically, the switch 30 routes the incoming calls to an agent in an appropriate workforce 32. The switch 30 includes a plurality of buffers 40 and an automated call-handling module (ACHM) 42. The ACHM 42 includes in some embodiments, tone and voice recognition logic for interfacing with subscribers and, if possible, providing the necessary services. For example, when the ACHM 42 receives a "Directory Assistance Type" call, the ACHM 42 delivers a series of questions to the caller such as: "what state?", "what city?", "what listing?". The ACHM 42 checks the database 36, and attempts to determine the requested information. The database 36 includes subscriber information such as name and telephone numbers of subscribers, addresses, etc. If the ACHM 42 cannot totally handle the incoming call, the call is placed in the appropriate buffer 40. In one preferred embodiment, the switch 30 associates information in the database 36 with information provided by the caller. When the call is taken out of the buffer 40 and provided to an agent, the switch 30 then provides the associated information to the agent via the computer network 44. Typically, associated information facilitates the agent in handling the call efficiently. For example, in one embodiment, the associated information includes information collected from the customer by the ACHM 42, i.e. city and listing, and typically, the associated information is then played to the agent without some of the initial silence before, between and after the customer verbal input.

Each one of the buffers 40 is associated with one of the workforces 32, and typically, multiple buffers, sometimes referred to as queues, are associated with a single workforce. For example, the buffers 40(1)-40(3) are associated with the directory assistance workforce 32(1). Thus, when the switch 30 receives an incoming directory assistance call that the ACHM 32 cannot handle the switch 30 places the incoming call into one of the buffers 40(1)-40(3). Typically, the directory assistance agents handle these calls based upon geographic regions because the directory assistance agents can normally handle calls faster for regions with which they are familiar. So, in one embodiment, the buffers 40(1)-40(3) are associated with different geographical regions, so that all of the "Directory Assistance Type" calls from a particular region are sent into the same buffer, and directory assistance agents who are familiar with that region handle those calls.

In addition, the buffers 40 for a workforce 32 can be prioritized. In one embodiment, high priority calls are put into one buffer 40 and lower priority calls are placed in a different buffer 40. Typically, the switch 30 handles the calls for a workforce 32 on a quasi first-in-first-out basis. For example, in one embodiment, the higher priority calls are prioritized by adding a "fictitious wait time" (FWT) to them, and then the switch 30 takes calls out of the buffer based upon a "pseudo-wait time" (PWT), which is the sum of the FWT and the real wait time (RWT), where RWT is the actual amount of time that the call has been in the buffer. For example, the FWT for buffer 40(1) is zero seconds, and the FWT for buffer 40(2) is two seconds. Thus, the RWT and PWT for calls in buffer 40(1) are the same, whereas, the PWT is two seconds ahead of the RWT for calls in buffer 40(2). The PWT for call 1 in buffer 40(2) is 3.2 seconds while its RWT is only 1.2 seconds. Based upon the PWT for calls in buffers 40(1) and 40(2), the switch 30 will take calls "1" and "2" from buffer 40(2) before taking call "1" from buffer 40(1).

The switch 30 provides system data to the force management system 28 and database 36. Various switch configurations typically use either scans or time stamps to determine how long calls wait for service. For this discussion, switch 30 receives counts and directs calls to the buffers and scans the buffers 40 every 10 seconds or so and determines how long each call has been in one of the buffers, i.e., the RWT for each of the calls. The switch 30 may then determine an average RWT for the calls in each buffer and provide an instantaneous buffer count and average RWT for each buffer, or the switch 30 may average the results from several scans together. However, for a given time span, the system data includes, but is not limited to, the number of calls received by the switch over the given time-span, the number of calls handled by the ACHM 38 over the given time-span, the average number of calls in each buffer 40 over the given time-span, and the average RWT for calls in each buffer over the given time-span. Typically, the system data is reported from the switch to the FMS 28 and database 36 approximately every 10 seconds or so. However, in alternative embodiments, the switch 30 may report system data more frequently or less frequently.

The switch also monitors agents in the workforces 32 and the super workforce 34. Before discussing the system data that is related to the agents in more detail, it is helpful to define some terms. For the purposes of this disclosure, a "tour" is defined as the time-spans that an agent is scheduled to work, and a "switch-tour" is defined as the time-spans that an agent is scheduled to be logged into the switch 30. On any given day, an agent's tour and switch-tour can differ due to scheduled training or other reasons. "Compliance" is defined as the percentage of an agent's switch-tour that the agent is logged into the switch. "Personal-occupancy" is defined as the percentage of an agent's switch-tour that the agent spends handling calls. The system data reported by the switch 30 includes personal-occupancy and compliance for each of the agents logged into the switch 30. The system data also includes personal average work time (AWT) for each of the agents, where average work time is the average amount of time that an agent spends handling a call. Because the switch 30 monitors, among other things, who is logged-in, when they logged-in and logged-out, how many calls the agents received, how long the calls lasted, etc., the system data reported by the switch 30 can include other quantities not described hereinabove. The average-work-time, occupancy, compliance, etc. can be calculated by the FMS 28 on a per-agent (personal) basis and/or calculated for the entire workforce.

Referring to FIG. 3, the FMS 28 includes a memory 46 having a statistical analysis/forecasting module 48, a call-statistics database 50, agent-profiles 52, a accumulated statistics 54, and a daily log 56. The call statistics database 50 includes accumulated statistics 54 and daily logs 56. The accumulated statistics 54 and daily logs 56 are broken down into workforces 32. Among other things, the statistical analysis/forecasting module 48 processes data in the call-statistics database 50 to generate, among other things, the accumulated statistics.

FIG. 4 illustrates one exemplary daily log 56 for workforce 32(5), and FIG. 5 illustrates exemplary accumulated statistics 54 for workforce 32(5). The quantities calculated and tabulated in the daily log 56 and the accumulated statistics 54 are generated by the switch 30 and FMS 28.

Referring to FIG. 4, exemplary daily log 56 includes the date of the log and quantities such as, but not limited to, daily call volume, daily average work time (AWT), daily average time-to-answer (ANS) and daily occupancy (OCC). The daily call volume is simply the number of calls received by workforce 32(5) during the day associated with the daily log, which in this example is Aug. 21, 2003.

The daily AWT is the average amount of time that an agent in workforce 32 spends working a call on that day. The daily ANS is the average amount of time a call spends in a buffer on that day. The daily occupancy (OCC) is a measure of the amount of time that the agents in workforce 32 work incoming calls on that day. The daily OCC is the average of the personal-occupancy for the agents in the workforce on that day.

The daily work volume is the amount of time in CCS (Centum Call Seconds) or XCS, a measurement of time where 1 XCS equals 10 seconds where the product of the daily call volume and AWT divided by 100. Generally, the different workforces handle calls of different complexity, and the time to handle a call is generally proportional to the complexity of the call. For example, calls to the billing workforce will require more time to handle than calls to the directory assistance workforce, and therefore, the AWT for the billing workforce is greater than the AWT for the directory assistance workforce. The work volume provides a way to compare the workforces 32 regardless of the type of calls that the different workforces handle.

Typically, the daily log 56 is kept in the statistical database 50 for a predetermined period of time such as six (6) months. The daily logs 56 are used for, among other things, spotting trends, scheduling agents, and refining workforce lines, as will be explained hereinbelow. In one embodiment, the daily log might be broken down into segments of time such as, but not limited to, morning, afternoon, evening, and night, and the statistics for each segment of time are then calculated.

Referring to FIG. 5, the accumulated statistics 54 include, among other things, averages of daily statistics. Thus, in one embodiment, the accumulated statistics 54 are averages of statistics that are found in the daily log that have been accumulated over a period of years. Typically, the accumulated statistics are based upon what is known as an average business day (ABD). Thus, Saturdays and Sundays, and holidays, are not included in the accumulated statistics 54. Typically, accumulated statistics 54 are used by the force management system 28 for, among other things, scheduling agents for a workforce 32 and/or super workforce.

The accumulated statistics can be averaged over a long period of time such as the entire time span over which the telephone system 10 has records of daily logs or shorter time-spans such as the last six years, or last six months, etc. One advantage of averaging over a long period is that the daily fluctuations are "washed" out of the average, but a disadvantage is that trends may also be lost. For example, assume that the ABD call volume for eight of the last ten years had remained at an approximate constant (X), in year nine the ABD call volume was 1.125X and in year ten it was 1.5X. In that case, the average ABD call volume of the last ten years is then 1.0625X, which obscures the rate of growth over the last two years.

In one preferred embodiment, the statistical analysis/forecasting module 48 fits the call volume data to a predetermined parameterized function, and then uses the parameterized function to extrapolate call volumes for a subsequent week. Those skilled in the art are familiar with algorithms, such as, but not limited to, least-square-fit for fitting data and all such algorithms are intended to be within the scope of the disclosure. Furthermore, as those skilled in the art will recognize, by fitting the data to a parametric function, derivatives including first order and higher order derivatives of the function can be taken to help extrapolate the data. In one embodiment, the statistical analysis/forecasting module 48 also includes logic to apply probabilistic algorithms such as, but not limited to, Erlang C to, among other things, forecast work volume and agent lines, which will be explained in detail hereinbelow.

An exemplary agent profile 52(A) is illustrated in FIG. 6 and the agent profile includes an agent identifier 62, a workforce identifier 64, an office identifier 66, language skill identifiers 68, and work skills identifier 70. The agent associated with the exemplary agent profile 52(A) currently works in remote office 5 in workforce 32(16). The agent associated with the exemplary agent profile 52(A) is bilingual (English and Spanish) and has been trained in both directory assistance and billing. The agent profile 52 includes skill ratings for each area that the agent has been trained, such as directory assistance rating 72 and a billing rating 74. Each rating includes, among other things, statistics related to the agents efficiency. The agent has an average work time (AWT) of 2.5 seconds for directory assistance and 5.5 seconds for billing. The skill ratings 72 and 74 also include the agents error rate, tour compliance, switch tour compliance, and years of experience. Switch-tour compliance is defined as the percentage of time that the agent is "logged into" the switch 30 per the workable amount of time per tour. Tour compliance is the probability that the agent will actually report to work for a tour that they are scheduled to work. Other quantities can also be included in the agent profile 52. In an alternative embodiment, quantities can be broken down into time segments. For example, AWT can be broken down into the first half of a tour and a second half of a tour, or for every fifteen minutes, or other time intervals. In one embodiment, the agent profile for a new agent, or an agent who is new to a workforce, is given an agent profile that has default values, among other things, for the skill ratings. After the agent has been trained and in the position for a set period of time, the default values are replaced by calculated values related to the agent's record.

FIG. 7 illustrates the predictable variable table (PVT) 54. The PVT 54 is used by the FMS 28 for predicting call volume based at least in part upon historical trends. The general concept behind the PVT 54 is that some days (abnormal days) do not correspond to "normal" days and that some of these days can be predicted because they repeat in a predictable manner. For example, it is well-known that Mother's Day is one of the busiest days of the year for a telephone system, and Mother's Day occurs yearly in a predictable manner. Thus, Mother's Day is included (but not shown) in the PVT 54. The PVT 54 includes abnormal days 76. Examples of abnormal days 76 include, but are not limited to, Mother's Day, Superbowl, etc.

The PVT 54 also includes group identifiers 78, and every abnormal day 76 has a group identifier 78 associated with it. In one embodiment, there are three types of groups: 0, 1, and 2. Group 0 comprises days that reoccur with no variation in their date of reoccurrence such as Christmas, Halloween, Valentine's Day, April Fool's Day and the Presidential Inauguration Day. Group 1 comprises reoccurring abnormal days that require confirmation as to their date of reoccurrence. For example, the opening day of the Summer Olympics reoccurs every four years, but the exact date changes. Group 2 comprises reoccurring abnormal days whose date of reoccurrence is variable but calculable. For example the Presidential Election is held on the $1^{st}$ Tuesday of November every four years and Thanksgiving is held on the fourth Thursday of November. Generally, the PVT 54 includes, but is not limited to, well known abnormal days such as holidays and days having religious significance and abnormal days that are not well known or easily remembered. For example because the date of Thanksgiving is variable, the number of days between Thanksgivings and Christmas is also variable. Generally, the number of days between Thanksgivings and Christmas is at least four weeks, but every so often, whenever Thanksgiving falls on November 28, they are separated by only three weeks and 6 days. When that occurs, the Friday after Thanksgiving is an abnormal day. Each abnormal day in Group 2 has a rule such as Thanksgiving being the fourth Thursday in every November or Thanksgiving falling on November 28, and the rules/conditions are used by the FMS 28 to determine the next reoccurrence for each abnormal day.

The PVT 54 includes scaling factor fields, and each abnormal day has a scaling factor 80 associated with it. The scaling factor 80 is the percentage by which the historical call volume on the abnormal day differs from the historical business day call volume. The PVT 54 also includes period fields 82 and date fields 84. Each period field 84 is associated with an abnormal day 76 and carries the approximate periodicity of the abnormal day. The approximate periodicity is normally measured in years. For each abnormal day, the date field 84 carries the next date that the abnormal day occurs.

In one embodiment, the FMS 28 checks the PVT 54 periodically to determine the next date of reoccurrence for abnormal days in Group 1. Typically, if the date in the date field 84 is in the past for a Group 1 abnormal day, the FMS 28 will provide a scheduler with a list of Group 1 abnormal days having expired dates so that the scheduler can provide future dates for those abnormal days. The scheduler may also edit the PVT 54 to add or delete abnormal days and edit elements of the PVT 54 or the rules/conditions for Group 2 abnormal days. The date fields 84 for Group 0 abnormal days are automatically updated by the FMS 28. The date field 84 for Group 2 abnormal days may be calculated as they expire or checked periodically. Typically, the FMS 28 uses the daily logs 56 in calculating new expiration dates for the date field 84. The daily logs 56 extends at least one year into the future. The FMS 28 scales the projected call volume for that day using the scaling factor 80.

Referring to FIG. 8, among other things, the FMS 28 generates an agent line 86 for a workforce 32. The agent line 86 shows the number of agents in a workforce that is projected to be needed for every fifteen minutes of an upcoming day. For the purposes of this disclosure, each fifteen-minute time span of the agent line 86 is an agent line segment 88. For a directory assistance workforce, the agent line 86 covers a 24-hour day, whereas the agent line for a billing assistance workforce may only cover ten hours of a day such as from 8:00 a.m. through 6:00 p.m. The agent line 86 is established by the FMS 28 using, among other things, historical information stored in the database 36.

Figure 9:
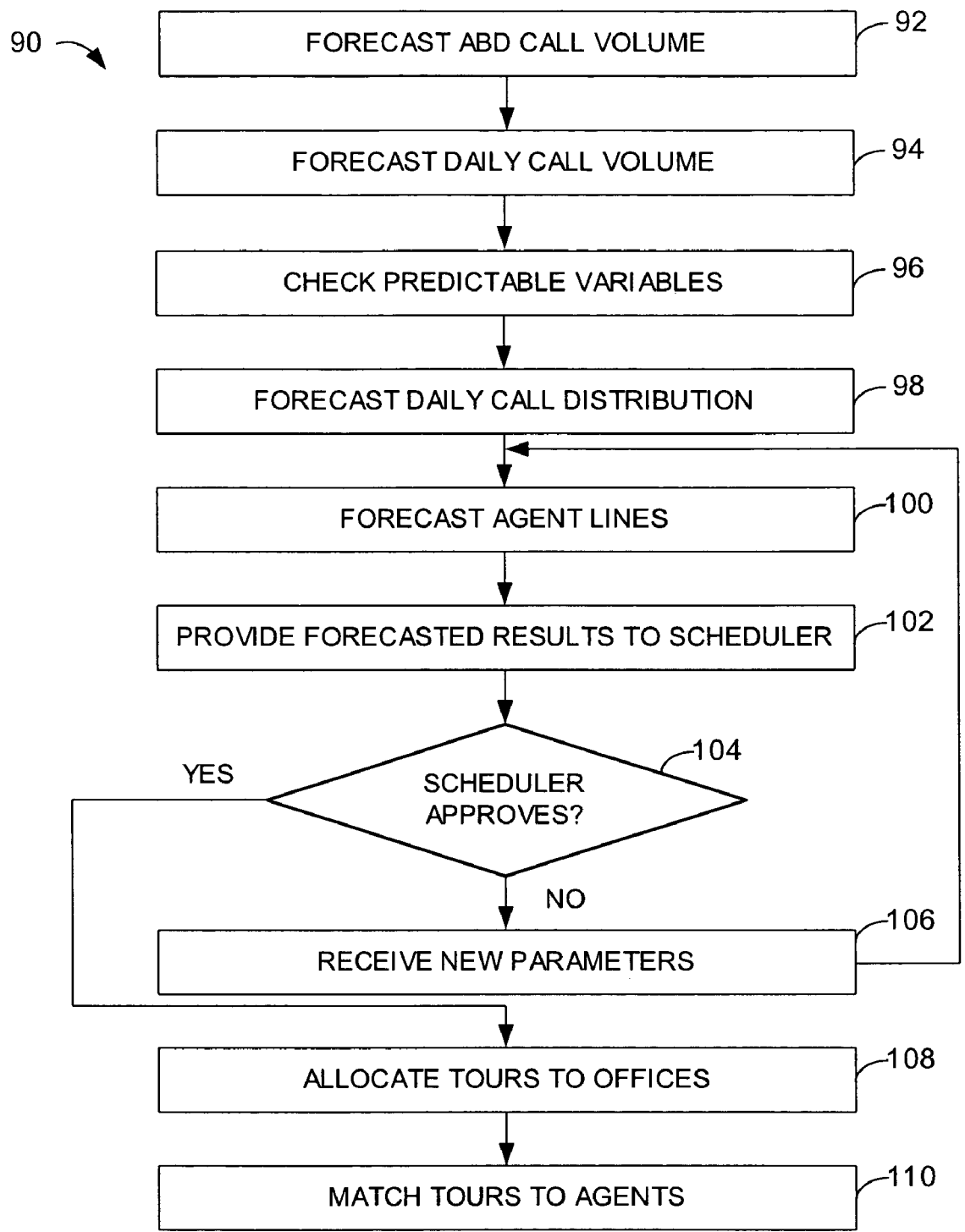
FIG. 9 is a flow chart illustrating steps for creating a projected agent line.

Referring to FIG. 9, the steps 90 shown in FIG. 9 include exemplary steps taken by the FMS 28 to generate the agent line 86 for a day in an upcoming week. Typically, the upcoming week is approximately two weeks in the future. The projected agent line 86 is forecasted approximately two weeks in advance so that the agents in the workforce having the projected agent line can be properly scheduled.

In step 92, the FMS 28 forecasts the ABD call volume for the upcoming week. The forecasted ABD call volume is based upon historical information and the database 36 such as the historical ABD call volume. Other factors may include, but are not limited to, historical trends in the ABD call volume. For example the statistical analysis/forecasting module can fit the call volume data to a parameterized function and then uses the parameterized function to forecast the call volume for the upcoming week. In one embodiment, a predetermined number of terms from a Taylor series expansion of the parameterized function is used to extrapolate the ABD call volume for the upcoming week.

In step 94, the daily call volume for each day of the week for the upcoming week is forecasted. Generally, the daily call volume follows historical trends. For example, the daily work volume on a Sunday is 75% of the work volume for an ABD. Table 1 shows a historical daily work volume per ABD work volume for an exemplary call center. Table 1 shows a historical daily call volume per ABD for a call center.

TABLE 1

| Day | Sun. | Mon. | Tues. | Wed. | Thurs. | Fri. | Sat. |
|---|---|---|---|---|---|---|---|
| Call Volume/ABD | 0.75 | 1.01 | 1.02 | 0.99 | 0.97 | 1.01 | 0.90 |

In step 96, the FMS 28 checks the PVT 54 and determines if any of the days of the week of the upcoming week are abnormal days. If so, the FMS 28 scales the projected work volume for the abnormal day 76 (or days) by the associated scaling factor 80.

In step 98, the FMS 28 generates a forecasted daily call distribution for every fifteen minutes for each day of the upcoming week. Each forecasted daily call distribution is based at least in part upon historical information and database 36. Specifically, the database includes historical call distributions for each day of the week.

In step 100, the FMS 28 uses adjustable parameters such as desired agent occupancy and desired AWT to generate forecasted agent lines for each day of the upcoming week based upon the forecasted call statistics. In one embodiment, the FMS 28 employs the statistical analysis/forecasting module 48 to apply algorithms such as Erlang C to calculate probabilities to determine agent requirements to meet a desired standard such as, but not limited to, average-time-to-answer to forecast the operator line. In step 102, the FMS 28 provides the forecasted results to a scheduler.

In step 104, the scheduler approves or disapproves the forecasted agent lines. If the scheduler disapproves, then in step 106, the scheduler provides new adjustable parameters to the FMS 28, and then the FMS 28 returns to step 100. On the other hand, if the scheduler approves, then in step 106, the FMS 28 allocates tours to the offices. For example, based upon an agent line, the FMS 28 determines that five agents need to start their tours at 6:00 a.m., nine agents need to start their tours at 7:00 a.m., and three agents need to start at 7:30 a.m. The FMS 28 then determines the number of tours at each starting time that should be allocated to the offices based at least in part upon the following criteria: the physical capabilities of each office and the number of agents available in each office. Offices having larger physical capabilities (more terminals/consoles) and a large number of agents will receive more tours than smaller offices.

In step 110, the FMS 28 matches the allocated tours to individual agents. Generally the matching of tours to agents is done at least upon seniority or other work place rules and agent preference.

In one embodiment, the FMS 28 provides the scheduler with two agent lines for each abnormal day. The first agent line is calculated as described hereinabove, and the second agent line is the line that would have been calculated if the day had not been abnormal, e.g., if the scaling factor for that day had been 1.0. In this embodiment, the scheduler can then determine which agent line is to be used to allocate and match tours.

The FMS 28, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the certain embodiments of the present disclosure includes embodying the functionality of preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, having thus described the disclosure, at least the following is claimed:

1. A computer implemented method of determining work schedules for agents in a call center, the method comprising:
   establishing a database in a computer, the database having past network statistics related to work volume as provided by a switch;

establishing another database of predictably re-occurring variations in the computer;
forecasting network usage for a given future date using the past network statistics and the predictably re-occurring variations using a force management system implemented in the computer;
storing the forecasted network usage in the computer memory;
determining work schedules for agents in the call center based on the forecasted network usage using the force management system;
presenting the work schedules to a scheduler for approval, and if the scheduler does not approve the work schedules:
receiving a new parameter from the scheduler; and
determining new work schedules for agents in the call center based on the new parameter using the force management system.

2. The method of claim 1, wherein forecasting network usage further includes:
extrapolating network usage into the future using the past network statistics.

3. The method of claim 1, wherein the database of predictably re-occurring variations includes abnormal events that re-occur annually.

4. The method of claim 3, wherein the database of predictably re-occurring variations includes abnormal events that have an approximate periodicity.

5. The method of claim 4, wherein the approximate periodicity is approximately one year.

6. The method of claim 3, wherein an average of a given network usage statistic is included in the past network statistics, and when a predictable abnormal event occurs, the given network usage statistic falls outside of a predetermined range that includes the average of the given network usage statistic.

7. The method of claim 6, wherein the given network usage statistic is related to call volume.

8. The method of claim 6, wherein the given network usage statistic is related to work volume.

9. The method of claim 1, wherein the network is a telephony network and the database of predictably re-occurring variations is related to past events having abnormal call volume.

10. The method of claim 1, further including:
determining a next date of re-occurrence for an abnormal event included in the database of predictably re-occurring variations.

11. A system for determining work schedules for agents in a call center, the system comprising:
one or more processors;
a memory storing a program of instructions for a network usage predictor, the network usage predictor comprising:
logic configured to establish a database having past network statistics related to work volume as provided by a switch;
logic configured to establish a database of predictably re-occurring variations;
logic configured to forecast network usage for a given future date using the past network statistics and the predictably re-occurring variations;
logic configured to store the forecasted network usage;
logic configured to determine work schedules for agents in a call center based on the forecasted network usage;
logic configured to present the work schedules to a scheduler for approval, and if the scheduler does not approve the work schedules:
logic configured to receive a new parameter from the scheduler; and
logic configured to determine new work schedules for agents in the call center based on the new parameter.

12. The network usage predictor of claim 11, further including:
logic configured to extrapolate network usage into the future using the past network statistics.

13. The network usage predictor of claim 11, wherein the database of predictably re-occurring variations includes abnormal events that re-occur annually.

14. The network usage predictor of claim 13, wherein the database of predictably re-occurring variations includes abnormal events that have an approximate periodicity.

15. The network usage predictor of claim 14, wherein the approximate periodicity is approximately one year.

16. The network usage predictor of claim 13, wherein an average of a given network usage statistic is included in the past network statistics, and when a predictable abnormal event occurs, the given network usage statistic falls outside of a predetermined range that includes the average of the given network usage statistic.

17. The network usage predictor of claim 16, wherein the given network usage statistic is related to call volume.

18. The network usage predictor of claim 16, wherein the given network usage statistic is related to work volume.

19. The network usage predictor of claim 11, wherein the network is a telephony network and the database of predictably re-occurring variations is related to past events having abnormal call volume.

20. The network usage predictor of claim 11, further including:
logic configured to determine a next date of re-occurrence for an abnormal event included in the database of predictably re-occurring variations.

21. A computer implemented method of determining work schedules for agents in a call center, the method comprising:
establishing a database in a computer, the database having past network statistics including an average of a given network usage statistic related to work volume as provided by a switch;
establishing another database of predictably re-occurring variations in the computer including abnormal events that re-occur annually;
forecasting network usage for a given future date using the past network statistics and the predictably re-occurring variations using a force management system implemented in the computer;
storing the forecasted network usage in the computer memory; and determining work schedules for agents in the call center based on the forecasted network usage using the force management system;
presenting the work schedules to a scheduler for approval, and if the scheduler does not approve the work schedules:
receiving a new parameter from the scheduler; and
determining new work schedules for agents in the call center based on the new parameter using the force management system,
wherein, when a predictable abnormal event occurs, the given network usage statistic falls outside of a predetermined range that includes the average of the given network usage statistic.

22. A system for determining work schedules for agents in a call center, the system comprising:
one or more processors;

a memory storing a program of instructions for a network usage predictor, the network usage predictor comprising:

logic configured to establish a database having past network statistics related to work volume as provided by a switch;

logic configured to establish a database of predictably re-occurring variations including abnormal events that re-occur annually;

logic configured to forecast network usage for a given future date using the past network statistics including an average of a given network usage statistic and the predictably re-occurring variations;

logic configured to store the forecasted network usage;

logic configured to determine work schedules for agents in a call center based on the forecasted network usage;

logic configured to present the work schedules to a scheduler for approval. and if the scheduler does not approve the work schedules:

logic configured to receive a new parameter from the scheduler; and logic configured to determine new work schedules for agents in the call center based on the new parameter, wherein, when a predictable abnormal event occurs, the given network usage statistic falls outside of a predetermined range that includes the average of the given network usage statistic.

* * * * *